(12) United States Patent
Kind

(10) Patent No.: US 8,875,801 B2
(45) Date of Patent: Nov. 4, 2014

(54) DEVICE FOR SETTING THE LEAKAGE RATE FOR A LEAKAGE AT A GAP-LIKE OPENING

(75) Inventor: Michael Kind, Berlin (DE)

(73) Assignee: Amrona AG (CH)

( * ) Notice: Subject to any disclaimer, the term of this patent is extended or adjusted under 35 U.S.C. 154(b) by 198 days.

(21) Appl. No.: 12/487,371

(22) Filed: Jun. 18, 2009

(65) Prior Publication Data

US 2012/0090860 A1    Apr. 19, 2012

(30) Foreign Application Priority Data

Jun. 18, 2008 (EP) ..................................... 08158514

(51) Int. Cl.

| A62C 2/00 | (2006.01) |
|---|---|
| A62C 2/06 | (2006.01) |
| E06B 7/23 | (2006.01) |
| A62C 99/00 | (2010.01) |

(52) U.S. Cl.
CPC ................. *A62C 2/06* (2013.01); *E06B 7/2318* (2013.01); *A62C 99/0009* (2013.01)
USPC ............................................. 169/45; 169/48

(58) Field of Classification Search
CPC .............. A62C 2/06; A62C 2/10; A62C 2/24; A62C 2/248; A62C 3/14; A62C 3/16; A62C 99/0009; E06B 7/2318

USPC ................................................ 169/45, 48–50
See application file for complete search history.

(56) References Cited

U.S. PATENT DOCUMENTS

| 3,183,649 A | 5/1965 | Teller |
|---|---|---|
| 5,425,543 A | 6/1995 | Buckshaw |
| 2006/0032241 A1 | 2/2006 | Gontcharov et al. |

FOREIGN PATENT DOCUMENTS

| CN | 1441687 A | 9/2003 |
|---|---|---|
| CN | 1889999 A | 1/2007 |
| CN | 1890000 A | 1/2007 |
| DE | 2260250 A1 | 6/1973 |
| EP | 1777478 A | 4/2007 |

*Primary Examiner* — Christopher Kim
(74) *Attorney, Agent, or Firm* — Orum & Roth, LLC; Keith H. Orum

(57) ABSTRACT

The present invention relates to a measure for minimizing an undesired passage of fluid from a first sector (1) to a second sector (2) separated by a non-fluid-tight separation (3), wherein a first pressure (P1-1) prevails in the first sector (1) and a lower second pressure (P2-1) than the first pressure (P1-1) prevails in the second sector (2). An intermediate chamber (4) which separates the two sectors (1, 2) from one another is arranged at the separation (3). A conveyor mechanism (5) is further provided which is designed to convey fluid from the intermediate chamber (4) to the first sector (1) in order to generate a lower pressure in the intermediate chamber (4) than the first pressure (P1-1) prevailing in the first sector (1), wherein the pressure (P4-1) generated in the intermediate chamber (4) is just as high or higher than the second pressure (P2-1) prevailing in the second sector (2).

18 Claims, 4 Drawing Sheets

DEVICE FOR SETTING THE LEAKAGE RATE FOR A LEAKAGE AT A GAP-LIKE OPENING

Figure 1A:
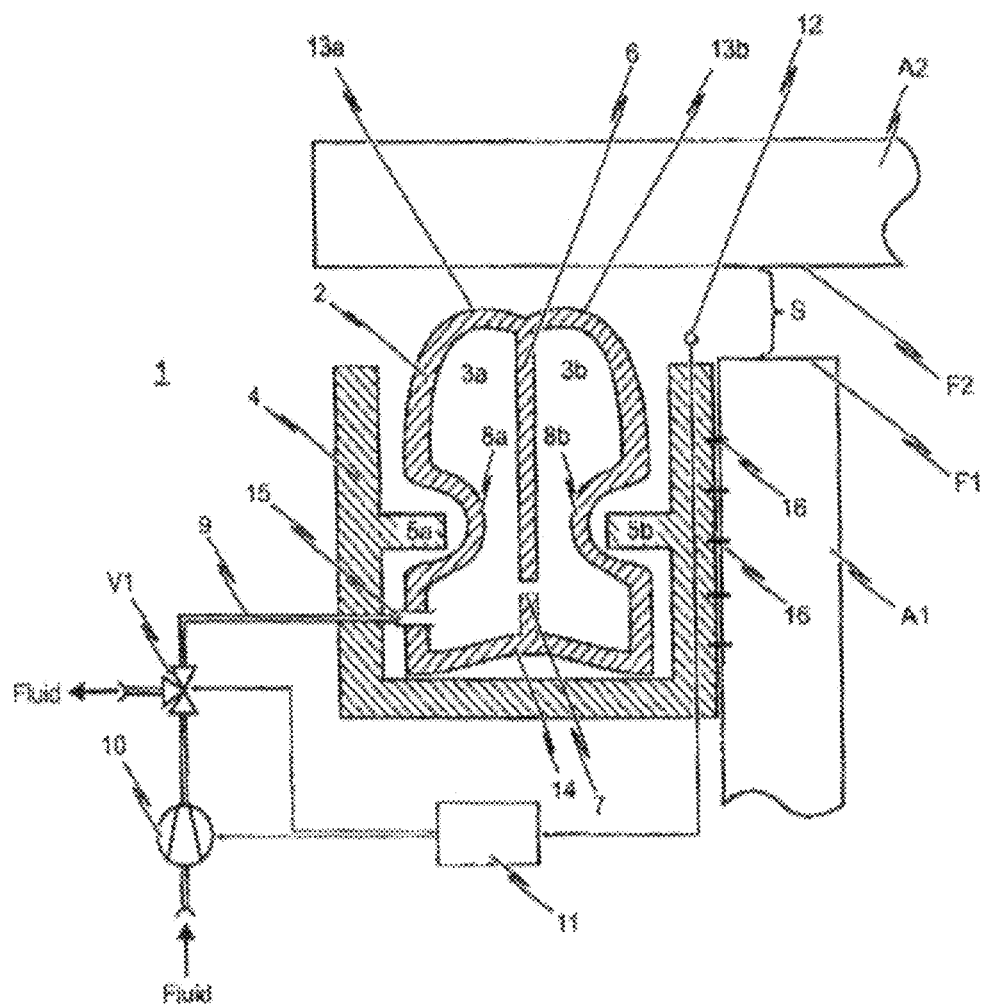

The present invention relates to a device for setting a leakage rate for a leakage at a gap-like opening, in particular at a gap-like opening between a rotor of a rotating heat exchanger system and a separation.

The airtightness of a building and specifically the airtightness of a room enclosed within a shell is an important criterion as regards both thermal insulation as well as the question of how to reduce infiltration heat losses. The airtightness of an enclosed room is determined by means of differential pressure test (blower door test). In the process, a constant positive pressure of e.g. 50 Pa is generated and maintained by a ventilator built into a spatial shell (usually at the door or window). The ventilator has to force the amount of air creeping through spatial shell leakage back into the enclosed room to be measured. The so-called n50 value indicates how many times the interior volume of air in the enclosed room is exchanged per hour.

Leakages in the spatial shell result in an undesired and uncontrolled exchange between the room's atmosphere and the external atmosphere. The exchange of air thereby occurring leads to a continuous adding of external air into the room's spatial atmosphere and a continuous discharging of internal air as exhaust air. The (undesired) exchange of air attributable to leakages in the spatial shell is that much greater the greater the difference is between the pressure prevailing inside the enclosed room and that outside of the room. This is the case, for example, in a clean room in which the infiltration of dust and dirt is prevented by having a positive pressure permanently prevail within the room compared to the external atmosphere. By so doing, particle contamination can be kept under certain values. Clean flows are needed for specific manufacturing processes, above all in semi-conductor manufacturing, in order to avoid any disturbance which might interfere with the structure of the integrated circuits on a an order of magnitude of fractions of a micrometer.

In a room in which a positive pressure is set compared to the external atmosphere, the leakages occurring due to the leakage in the spatial shell ultimately result in the medium within the room's atmosphere escaping through the room's leakages and thus the positive pressure being reduced.

However, the passage of fluid to the external atmosphere occurring from the room's atmosphere due to leakage in the spatial shell particularly also plays a role in the case of rooms having an atmosphere of reduced oxygen content compared to "normal" air, occasioned for example by the addition of an oxygen-displacing gas (hereinafter referred to simply as "inert gas"). This type of inerting level in which the room's spatial atmosphere has a reduced oxygen content compared to "normal" air is often used for preventive fire control purposes. By reducing the oxygen content in the enclosed room, the risk of a fire developing can be minimized.

Since an undesired passage of fluid from the spatial atmosphere of the room rendered inert to the external atmosphere can occur through the leakages in the spatial shell, the impermeability to the spatial shell is an important criterion in preventative fire control in terms of how much inert gas must be supplied to the enclosed room per unit of time in order to continuously maintain the desired inertization necessary to provide effective protection against fire. The problem in this is that because of the leakage flows attributable to the leakages in the spatial shell of a room rendered inert, fresh air, and thus oxygen, is continuously supplied (undesired) to the inerted room such that—given no further supply of inert gas—the oxygen content in the room's atmosphere continuously increases and the desired fire control is no longer afforded.

This effect is particularly pronounced when a higher pressure prevails in the enclosed room compared to the external atmosphere.

On the other hand, a certain exchange of air is often desired for enclosed rooms in order to exchange the room's air with outside or fresh air. In common rooms, for example, an exchange of air is necessary in order to supply oxygen, to remove carbon dioxide and to eliminate condensation. Air exchange is also often essential in storage rooms which people never or only briefly enter so as to discharge harmful components emitted for example by the goods stored in the storage room.

When a building or spatial shell is designed to be virtually air-tight, as modern building methods stipulate, an unregulated exchange of air leading to an undesired and uncontrolled exchange of air between the room's atmosphere and the external atmosphere can no longer occur. By intentionally providing leakages in the spatial shell, the necessary air exchange can be restored. Window and doors joints, for example, are suitable as such spatial shell leakages. However, the air exchange rate in such cases is not constant but rather greatly dependant on weather, in particular wind. The air exchange rate provided an enclosed room furthermore changes as a function of, for example, people entering the room or (generally speaking) how the room is used. The air exchange rate attainable by leakage intentionally provided in the spatial shell needs to be able to disregard these fluctuations in the air exchange rate related to the use of the room.

Accordingly, the present invention addresses the problem of specifying an easily-realized solution for adapting the air exchange rate attainable with leakage intentionally provided in a spatial shell to a minimum necessary air exchange rate target to be provided for a room. In particular, it should also be possible to compensate as needed for weather-related fluctuations in the air exchange rate attainable with leakage.

To solve this problem, the invention proposes a device which is designed to set a leakage rate at a gap-like opening. To this end, the device comprises a sealing body having at least one chamber, wherein the sealing body is formed at least in part from a flexible material. The device further comprises a system of pipes connected the at least one chamber through which a fluid can be supplied to the chamber. Since the sealing body is formed at least in part from a flexible material, a regulated feed of fluid to the at least one chamber effects a defined cross-sectional expanding of the sealing body. The cross-sectional expanding of the sealing body effected by the supply of fluid is used to at least partly seal the leakage and thus vary the leakage rate of the leakage.

Because the supply of fluid to the at least one chamber ensues in regulated manner according to the invention, the cross-sectional expanding or cross-sectional varying of the sealing body is adjustable. The leakage rate of the leakage provided for example intentionally in the spatial shell can thereby be set to a specific value adapted to the respective application. To this end, the sealing body is to be arrange respective the leakage such that the cross-sectional expanding of the sealing body upon the fluid being supplied to the at least one chamber ensues in the direction of the leakage.

One preferred realization of the solution according to the invention provides for a retainer by means of which the sealing body is preferably retained in the direct proximity of the leakage so that upon a supply of fluid, the cross-sectional expanding of the sealing body at least partly covers the leakage and thus reduces the leakage rate of the leakage. Conceivably here is for the retainer to be configured as a profile so that it is not only accorded a retaining function but also a guiding function. The guiding function affects the targeted expansion of the sealing body in the direction of the leakage upon its cross-sectional expanding.

The inventive solution enables the leakage rate of a leakage, in particular at a gap-like opening, to be set to a definable value be a cross-section expanding of the sealing body expanding preferably in targeted manner in the direction of the leakage and thus at least partly sealing the leakage. The extent to which the leakage is sealed is thereby contingent upon the degree to which the sealing body expands.

In order to control the cross-sectional expanding of the sealing body in a particularly simple to realize yet effective manner, one preferred realization of the inventive solution provides for a controller designed to set the cross-sectional expanding of the sealing body effected by the supply of fluid as a function of a predefined maximum allowable leakage rate for the leakage. The cross-sectional expanding of the sealing body is preferably set by a predefinable volume of fluid being supplied to the at least one chamber of the sealing body.

One particularly preferred realization provides for pressurizing the at least one chamber of the sealing body with a pressurized fluid such as, for example, compressed air or nitrogen from a gas cylinder so as to effect an inflating of same and thus a cross-sectional expanding of the sealing body. To this end, the inventive device preferably comprises a fluid source (generator, pressure cylinder, etc). The fluid source is connectable to the at least one chamber of the sealing body by means of the pipe system, or by means of an appropriate valve arrangement. It is hereby preferred for the fluid to be fed from the fluid source to the at least one chamber in regulated manner.

To be noted in summary is that the solution according to the invention provides an easily-realized setting of the leakage rate for e.g. a leakage intentionally provided in a spatial shell, and preferably gap=shaped, to a freely-selectable value by pressurizing the at least one chamber of the sealing body in regulated manner with a fluid such as compressed air, for example. Doing so results in a cross-sectional expanding of the sealing body, as a consequence of which the sealing body expands in the direction of the leakage and seals same at least to a partial extent. The inventive solution is especially suited to setting a leakage rate for a gap-shaped leakage (gap opening) in the spatial shell of an enclosed room.

Yet the invention is by no mean limited to just the above. Surprisingly, is has been shown that the inventive solution is also suited to setting a definable leakage rate for a gap between a rotor of a rotating heat exchanger and a separation. A rotating heat exchanger is a heat exchanger which enables heat recovery in two air flows. Thermal energy is thereby transferred from a warm fluid flow to a cold fluid flow by a rotating thermal mass in the form of a rotor (or thermal wheel) being alternatively heated by the warm fluid flow and cooled by the cold air flow.

The rotor or rotating heat exchanger usually consists of numerous ducts parallel to the rotor's rotational axis, whereby the warm fluid flows through some of the ducts and the cold fluid flows through the other ducts, thereby utilizing the ability of the duct walls to store thermal energy. Specifically, the warm fluid flow is channeled through a first half of the rotor, thereby heating the ducts provided in this one half of the rotor. Upon the rotor rotating further, the warmed ducts reach the area where the cold fluid flows through them. The warm walls of the ducts heat the cold fluid which equivalently leads to a cooling of the duct walls.

At the present time, rotating heat exchangers are frequently utilized in ventilation and air-conditioning systems in ventilated buildings as well as in the offshore sector (e.g. cruise ships).

However, rotating heat exchangers can only be used for certain applications since, due to the design of same, the heat transfer which a rotating heat exchanger produces cannot completely prevent a transfer of material between the warm and the cold fluid flow. Particularly unavoidable with conventional rotating heat exchanges is that there is always a gap between the rotor and the seal at the partition, the body of the rotor respectively, where leakage of air occurs. The extent of this so-called leakage or leakage loss is determined by the difference in pressure between the sector through which the warm fluid flows and the sector through which the cold fluid flows and the size of the gap opening. Apart from impacting the quality of the room's atmosphere, such leakage loss also impacts the volume of the room's atmosphere.

Various approaches are known in the prior art for minimizing the leakage loss occurring with rotating heat exchangers. One approach provides for slipper seals in the gap between the rotor and the partition, the rotor body respectively (cf. hereto e.g. the implementation in U.S. Pat. No. 4,056,141 B).

A substantial disadvantage of using such slipper seals to seal the gap is especially seen in that such slipper seals do not allow a setting of the gap's leakage rate, i.e. the leakage loss occurring through the gap.

In some applications, however, it is in fact desired to have a minimum required (target) air exchange for an enclosed room through the gap of a rotating heat exchanger so as to be able to dispense with a further (intentionally provided) leakage in the spatial shell of the enclosed room. Since, however—as noted above—the value for the minimum air exchange rate to be provided is contingent upon different parameters and is especially not constant over time, it is desirable with a rotating heat exchanger to be able to set a freely-selectable value for the leakage loss occurring through the gap; i.e. the leakage rate of the rotating heat exchanger's gap openings.

This can be realized with the solution according to the invention when it used together with a rotating heat exchanger system of the type described above. Accordingly, the inventive solution is particularly suited to setting a definable leakage rate through the gap between a rotor of a rotating heat exchanger and a separation, the body of a rotating heat exchanger respectively. In so doing, an expandable sealing body is to be arranged so as to be regulatable as needed in the proximity of the gap responsible for the leakage loss.

It is in particular conceivable for the sealing body to exhibit a tubular chamber arranged on a side of the separation preferably in the direct proximity of the gap.

In one preferred realization of the heat exchanger system in which the inventive solution is used to set the leakage loss, a controller is preferably provided which is designed to adjust the cross-sectional expanding of the sealing body effected by the supplying of fluid as a function of the rotor's rotational speed. Conceivable here in a case when the rotor is at rest, for example, would be for the at least one chamber of the sealing body to be fully pressurized by a pressurized fluid such as e.g. compressed air or nitrogen from a compressed gas cylinder or a nitrogen generator, in order to thereby effect a maximum cross-sectional expanding of the sealing body and thus a complete sealing of the gap. It is therefore possible to completely eliminate gap losses when the rotor or the heat exchanger is at rest; i.e. when heat transfer is neither necessary not desired.

Based on all the above, it is evident that the inventive solution can prevent an exchange of material through leakage loss in a rotating heat exchange system—if desired, it can also wholly eliminate it.

This makes it possible to use the rotating heat exchanger system to transfer thermal energy between a warm fluid flow and a cold fluid flow, wherein the warm fluid flowing through a first sector of the heat exchanger system is drawn in from an enclosed room and after flowing through the rotating heat exchanger, fed back to the enclosed room again, and wherein an inerting system is used to minimize the risk of fire and to extinguish fire in the enclosed room. This type of inerting system serves to supply an oxygen-displacing gas to the room's atmosphere in the event of a fire, or to minimize the risk of a fire in the enclosed room, in order to lower the oxygen content in the enclosed room to a predefined or definable inerting level at which the inflammability of most combustible materials is significantly reduced.

Usually, the temperature of an enclosed room equipped with this type of inerting system is not modulated with a rotating heat exchanger system since due to the unavoidable leakage, the applicable inertization of the enclosed room is only possibly by continuously adding oxygen-displacing (inert) gas, which is not beneficial in terms of the general operating costs.

As the solution according to the invention is used to at least partly seal the gap in a rotating heat exchanger system in regulated manner, the leakage caused by the gap can be used on the one hand to release pressure when, in the case of a fire, for example, the enclosed room is to be flooded with inert gas within the shortest amount of time. On the other hand, it is further conceivable for maintaining inertization in the enclosed room to completely seal the gap opening between the rotating heat exchanger and the separation so that an inerting level preset for the room's atmosphere can be maintained without needing to add large quantities of inert gas.

In the case of a fire or to minimize the risk of a fire the oxygen content in the enclosed room can be lowered to a predefined or definable inerting level by introducing an oxygen displacing gas. Moreover, by supplying fluid to the at least one chamber of the sealing body, the cross-section of the sealing body can be expanded such that the gap of the rotating heat exchanger system is at least partly sealed.

The following will reference the accompanying drawings in describing the invention in greater detail on the basis of embodiments.

Shown are.

Figure 2:
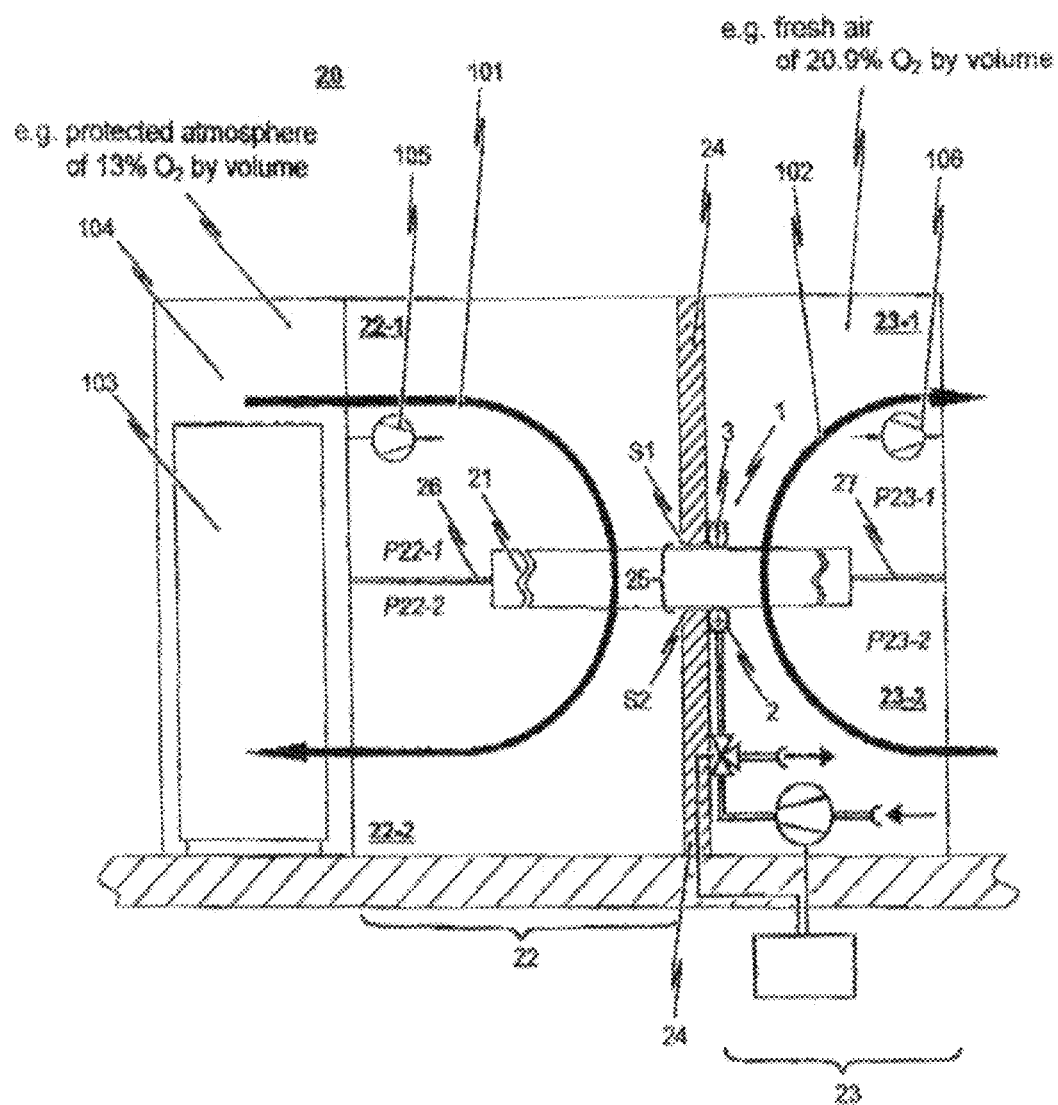
Figure 3:
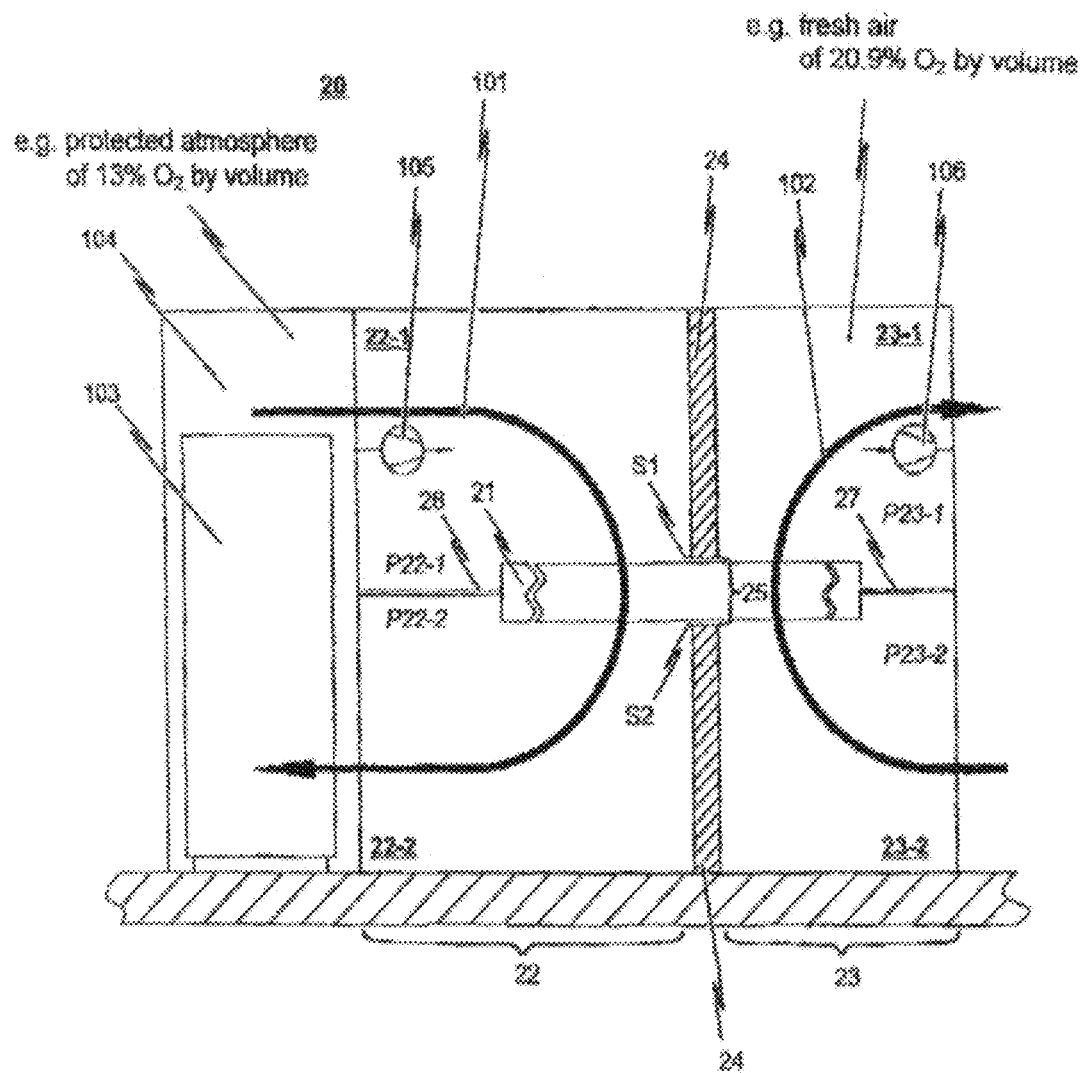

FIG. 1 a schematic view of an embodiment of the device according to the invention for setting a leakage rate for a leakage of a gap-shaped opening:

FIG. 2 a schematic view of a heat exchanger system for transferring thermal energy between a warm fluid and a cold fluid, wherein the rotating heat exchanger system comprises the inventive device to minimize an undesired passage of fluid from a first sector through which the warm fluid flows to a second sector through which the cold fluid flows; and FIG. 3 the rotating heat exchanger system depicted in FIG. 2 without the inventive device for setting the leakage rate for the gap openings of the rotating heat exchanger system.

Figure 1B:
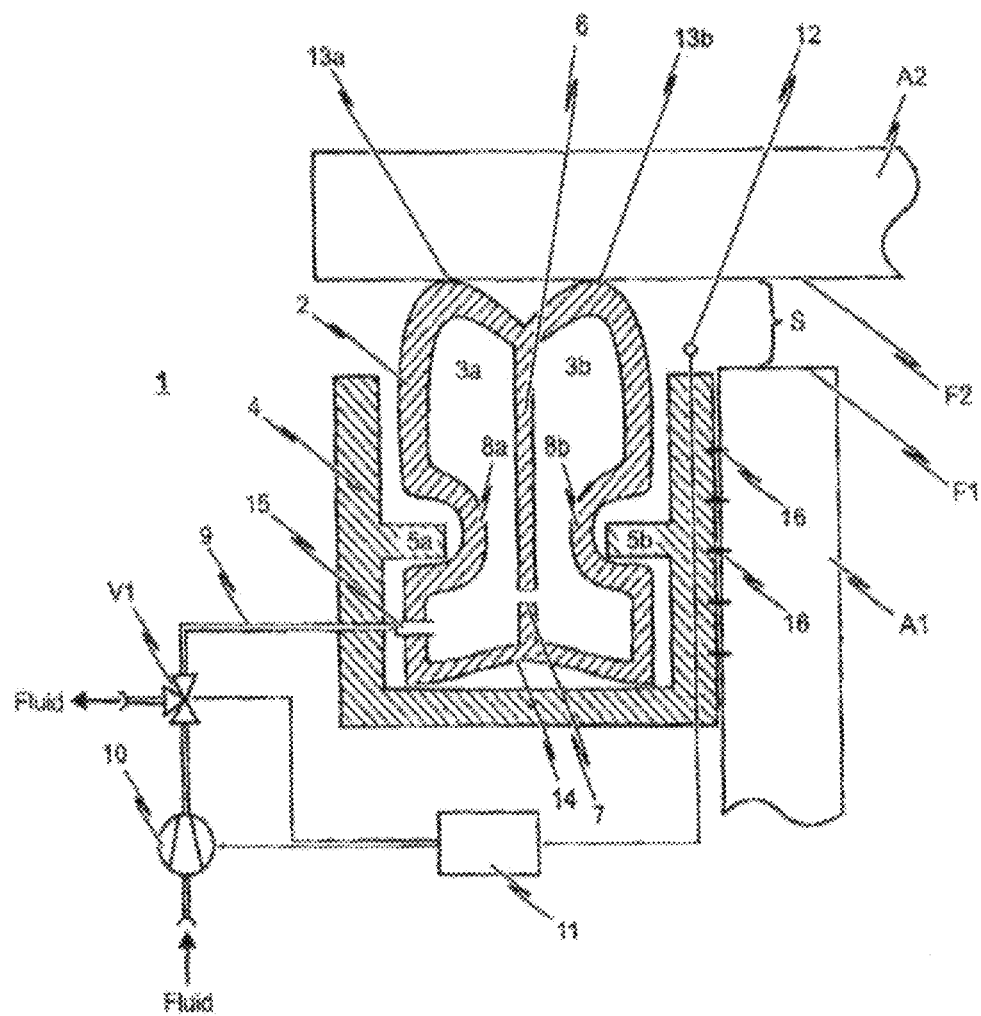

FIG. 1 shows a schematic view of preferred embodiment of the device 1 according to the invention for setting a leakage rate for a leakage S between two surfaces F1, F2. In detail, FIG. 1A shows the device 1 with the sealing body 2 in an unexpanded state while FIG. 1B shows the device 1 in a state in which the sealing body 2 is pressurized by a fluid, in particular compressed air, and thus the sealing body 2 I in an expanded state.

The device 1 in the embodiment depicted in FIG. 1 serves to seal a leakage S formed between a first component A1 and a second component A2 which—as shown—is in the form of a gap between a front face S1 of the first component A1 and a lateral surface S2 of the second component A2. The inventive device 1 is especially suited to setting a leakage rate for leakage S, hereinafter to also be referred to as "gap." To this end, the device 1 is fixed to a heated lateral surface F1 of the first component A1 and acts in the direction of the lateral surface F2 of the second component A2.

The embodiment of the inventive device 1 depicted in FIG. 1 comprises a sealing body 2 made from a flexible maternal, in particular a rubber material. A center wall 6 divides the interior of the sealing body into a first chamber 3a and a second chamber 3b. These two chambers 3a, 3b are in fluidic connection by means of an opening 7 formed in the center wall 6. A pipe system 9 is moreover provided which in the embodiment as depicted is connected on the one side to the first chamber 3a by means of a nozzle 15 and on the other side to a fluid source 10. Utilized as a fluid source 10 in the embodiment as depicted is a compressed air source in the form of a compressor controllable by a controller 11. It is however also conceivable to provide for a gas cylinder or a gas cylinder bank as the fluid source 10 in order to supply a pressurized fluid as needed to the pipe system 9, and in particular to the two chambers 3a, 3b.

A valve V1, likewise controllable by controller 11, is arranged in the pipe system 9 via which the fluid source 10 can be fluidically connected to the first chamber 3a. Valve V1 is preferably configured as a three-way valve which allows a regulated feed of the pressurized fluid from the fluid source 10 to the two chambers 3a, 3b of the sealing body 1 on the one hand and, on the other, a regulated discharge of fluid from the previously pressurized chambers 3a, 3b. This allows for adjusting the deformation of the sealing body 2 as will be described below with reference to FIG. 1B.

At its upper sealing face, the sealing body 2 exhibits two sealing lips 13a, 13b respectively allocated to the two chambers 3a, 3b. As shown, the center wall 6 serves to connect the two sealing lips 13a, 13b to the base 14 of the sealing body 2. Of course, the invention is not limited to a device 1 which—as shown in FIG. 1—exhibits a sealing body 2 with two chambers 3a, 3b with said two chambers 3a, 3b being spatially separated from one another by means of a center wall 6. Rather, it is in fact conceivable for the sealing body 2 to only have one chamber correspondingly connected to a fluid source 10 via a pipe system 9.

Nor is the invention limited to the chamber(s) 3a, 3b of the sealing body 2 being pressurized by compressed air. Any fluid which can be fed to the chamber(s) 3a, 3b of the sealing body 2 through a pipe system 9 in order to effect an expansion of the sealing body 2 is in principle conceivable.

The sealing body 2 in the embodiment depicted in FIG. 1 is held in the direct proximity of the leakage S by means of a retainer 4. Screwed connections 16 thereby connect the retainer 4 to the lateral surface F1 of the first component A1. As depicted, the retainer 4 is configured as a profile open toward the lateral surface F2 of the second component A2. This ensures that upon the pressurizing of the chambers 3a, 3b for example with compressed air, the sealing body 2 will expand in the direction of the second lateral surface F2.

The direction in which the sealing body 2 expands in the embodiment as depicted is not, however, solely determined by the profile shape of the retainer 4, but also by the center wall 6. The center wall 6 provides the sealing body 2 with its preferred orientation when expanding.

In the embodiment of the inventive device 1 shown in FIG. 1, each chamber 3a, 3b of the sealing body 2 exhibits a flute 8a, 8b into which an associated projection 5a, 5b of the retainer 4 meshes in order to hold the sealing body 2 in position relative the retainer 4. In place of such projections 5a, 5b meshing with flutes 8a, 8b, it is of course also conceivable to, for example, connect the base 14 of the sealing body 2 to the base of the profile-configured retainer 14.

The functioning of the inventive device 1 will be described in greater detail below with reference to FIG. 1B.

As noted above, the pipe system 9, which is connectable to the two chambers 23a, 3b by means of valve V1, allows the feed of compressed air or a pressurized fluid. The fluid supply to the chambers 3a, 3b of the sealing body 2 is regulated by the controller 11 as a function of the desired leakage rate for leakage S. In a case where the leakage S is to be completely sealed by the sealing body 2, the controller 11 effects the pressurizing of the two chambers 3a, 3b of the sealing body 2 with the pressurized fluid such that a maximum cross-sectional expanding of sealing body 2, and thus a maximum expansion of the sealing body 2, can be effected in the direction of the two lateral surfaces F2, FIG. 1B depicts exactly this state.

To be in particular noted from the representation provided in FIG. 1B is that for the complete sealing of the leakage S, the sealing body 2 expands in the direction of the two lateral surfaces F2 such that the two sealing lips 13a, 13b abut the two lateral surfaces F2 and thus completely seal the leakage S.

To be kept in mind is that the embodiment of the device 1 according to the invention is shown in both FIGS. 1A and 1B in a sectional view from the side. When the inventive device 1 is to be utilized to set the leakage rate of a leakage occasioned by an annular gap, the inventive device 1 is of corresponding annular design and disposed at the annular gap.

The inventive device 1 is particularly characterized by being able to set the leakage rate for a leakage S to a predefined value. The leakage rate is the quotient from the pV-value of a gas flowing through a pipe's cross-section over a specific interval of time and this specific interval of time.

Thus, the pV-value is the product of the pressure and volume of a specific quantity of a gas at the currently prevailing temperature. The leakage rate depends on the type of gas, a difference in pressure between the beginning and end of the pipe cross-section and/or the leakage and the temperature respectively.

The present invention is therefore based on the recognition that the leakage rate of a leakage can be varied by correspondingly increasing or decreasing the cross-section of the leakage through which the gas will flow. In the present invention, this change in the flow cross-section ensues from the regulated pressurizing of the chambers 3a, 3b with a fluid, e.g. compressed air, so as to effect the targeted expansion of the sealing body 2 in the cross-section of pipe at the leakage S. As explained above, this targeted expansion of the sealing body 2 in the flow cross-section of the leakage S ensues by depending on the leakage rate to be set—the chambers 3a, 3b being subject to different degrees of fluid pressurization.

It is in principle conceivable for the inventive device 1 to comprise means for detecting the leakage rate through the leakage S in order to transmit the actual leakage rate set to the controller 11 continuously or at predefined times or upon predefined events and thus form a control system. With the embodiment of the inventive device 1 depicted in FIG. 1, a flow sensor 12 is disposed for this purpose in the pipe cross-section at leakage S. This flow sensor 12, which can be configured as a non-contact ultrasonic flowmeter, for example, is correspondingly connected to the controller 11 such that the controller 11, the flow sensor 12 and the valve V1 controllable by the controller 11 constitute one control system, allowing for a very precise setting of a desired leakage rate for leakage S.

The inventive device 1 was developed particularly with regard to the problem of being able to adjust the design-contingent leakage losses occurring between the rotor and the rotor body or a partition of a rotating heat exchanger system. Thus, the invention is at the same time also directed to rotating heat exchanger system which utilizes the device I described above with reference to FIG. 1 as an example in order to be able to set the flow cross-section of the gap at the rotor of the rotating heat exchanger system in regulated manners.

The following will reference FIG. 2 in describing a rotating heat exchanger system 20 in which the inventive device 1 is utilized to adjust the leakage losses which occur, and in particular the regulating of the passage of fluid occurring between the heat exchanger media (first or warm fluid and second or cold fluid) per unit of time.

As indicated above, the rotating hear exchanger system 20 described in the following with reference to FIG. 2 is a system which uses a thermal wheel or rotor 32 as the heat exchanger. It is pointed out that this refers solely to one preferred use of the inventive device 1. The inventive solution can naturally also be used in other applications in order to set a leakage rate for a leakage to a defined or predefinable value.

To illustrate how the inventive device 1 works, a rotating heat exchanger system 20 has been selected in which a rotor 21 effects a semi-direct transfer of heat between a warm fluid 101 flowing in a first sector 22 and a cold fluid 102 flowing in a second sector 23. Since there will always be leakages between the rotor 21 on the one hand and the separation 24 separating the warm fluid flow 101 from the cold fluid flow 102 on the other in such types of rotating heat exchangers due to their design, the rotating heat exchanger system 20 depicted schematically in FIG. 2 is especially suited to demonstrating the advantages attainable with the inventive solution.

However, before going into how the device 1 according to the present invention used in a rotating heat exchanger system works, the functioning of a conventional rotating heat exchanger 20 will first be described with reference being made to the representation provided in FIG. 3.

The rotating heat exchanger system 20 depicted schematically in FIG. 3 and generally known from the prior art is configured as follows: the rotating heat exchanger system 20 comprises a first flow sector (hereinafter called "first sector 22") through which flows a warm fluid 101. A second flow sector (hereinafter called "second sector 23") through which flows a cold fluid 102 is further provided.

For the warm fluid flow, it is for example conceivable to use the exhaust air from data processing equipment 103, whereby—as FIG. 3 indicates—this data processing equipment 103 is disposed in a server room 103 adjacent the first sector 22. Conceivable for cooling such data processing equipment 103 is utilizing a first ventilator system 105 to feed the (warm) exhaust air from the server room 104 to the rotating heat exchanger system 20. In the rotating heat exchanger system 20, thermal energy from the warm fluid 101 is transferred through a heat exchanger (rotor 21) to the cold fluid flow 102 flowing through the second sector 23. After passing through the heat exchanger (rotor 21), the cooled fluid flow 101 is recirculated back to the server room 104.

The cold fluid flow 102 used as the cooling medium flows through the second sector 23 of the heat exchanger system 20, wherein a second ventilator system 106 us used to e.g. draw in outside air to cool the heat exchanger (rotor 21) and recirculate it back to the outside atmosphere in warmed form after it passes through said heat exchanger 21.

The first sector 22, through which the warm fluid 101 to be cooled flows in the rotating heat exchanger system 20, and the second sector 23, through which the cold fluid 102 to be warmed flows in the rotating heat exchanger system 20, are spatially separated from one another by a first separation 24 configured partition. A rotor opening 25 is provided in this first separation 24 through which extends the rotor 21 utilized as the heat exchanger.

The rotor 21 is rotatably-mounted thermal wheel, wherein its rotational axis preferably runs through the rotor opening 25 formed in the first separation 24. The rotor 21 comprises numerous ducts parallel to its rotational axis. The transfer of heat utilizes the ability of the walls of these ducts to store thermal energy (heat). The warm exhaust air from the data processing equipment 103 (warm fluid 101) is blown through the ducts situated in the half of the rotor 21 positioned in the first sector 22. So doing heats the walls of the respective ducts.

When the rotating heat exchanger is operating, the rotor 21 continues to turn s that the warmed ducts reach the area in the second sector 23 through which flows the cold outside air (cold fluid 102). The walls of the ducts previously heated in the first sector 22 heat the cold fluid 102, which ultimately leads to a cooling of the walls.

Necessary for the operation of the heat exchanger system 20 according to the FIG. 2 representation is for the flow of warm fluid in the first sector 22 to be routed through the appropriate ducts of the rotor 21 actually situated right in said first sector 22. In like manner, it needs to be ensued that the flow of cold fluid 102 in the second sector 23 is routed through those ducts of the rotor 21 actually situated right in said second sector 23.

To achieve this, the rotating heat exchanger system 20 is furnished with a second and a third separation 26, 27. The second separation 26 is arranged in the first sector 22 such that the first sector 22 is divided into a first warm fluid chamber 22-1 and a second warm fluid chamber 22-2. The first warm fluid chamber 2201 is fluidically connected to the second warm fluid chamber 22-2 by means of the ducts of the rotor 21 situated in the first sector 22.

Conversely, the third separation 27 is arranged in the second sector 23 such that the second sector 23 is divided into a first cold fluid chamber 23-1 and a second cold fluid chamber 23-2, wherein these two cold fluid chambers 23-1, 23-2 are fluidically connected by means of the ducts of the rotor 21 situated in the second sector 23.

Particularly to be noted from the representation provided in FIG. 3 is that the second separation 26 and third separation 27 are arranged such that they extend radially to the rotor 21 and perpendicular to the rotational axis of said rotor 21.

Since the rotatably-mounted rotor 21 which runs through the first and second sector 22, 23 upon rotation constitutes a flow resistance in both the first as well as the second sector 22, 23 through which the respective fluid flow has to pass in the rotating heat exchanger system 20, a first pressure P22-1 is set in the first warm fluid chamber 22-1 and a third pressure P22-2 is set in the second warm fluid chamber 22-2 separated from the first warm fluid chamber 22-1 by the rotor 21 and the second separation 26, wherein said third pressure P22-2 is lower than said first pressure P22-1.

Since the rotating heat exchanger system 20 works according to the counterflow principle (at least in the embodiment depicted in FIG. 3), a pressure (second pressure P23-1) prevails in the first cold fluid chamber 23-1 which is lower than the pressure (fourth pressure P23-2) prevailing in the second cold fluid chamber 23-2.

Accordingly, a pressure difference develops between the first warm fluid chamber 22-1 and the first cold fluid chamber 23-1, separated from one another by the first separation 24, whereby the first pressure P22-1 prevailing in the first warm fluid chamber 22-1 is higher than the second pressure P23-1 prevailing in the first cold fluid chamber 23-1. In like manner, a pressure difference also arises between the second warm fluid chamber 22-2 and the second cold fluid chamber 23-2. The fourth pressure P23-2 prevailing in the second cold fluid chamber 23-2 can be higher than the second pressure P22-2 prevailing in the second warm fluid chamber 22-2.

Since the rotor opening 25 is provided in the first separation 24 through which the rotor 21 extends, and since there is always a space (upper and lower gap S1, S2) between the respective lateral surfaces of the rotor 21 and the surfaces of the first separation 24 abutting thereto in the rotor opening 25, the first separation 24 cannot as a whole be considered a fluid tight partition with which the first sector 22 and the second sector 23 are separated from one another so as to be impermeable to matter. Rather, the difference in pressure arising between one warm fluid chamber 22-1, 22-2 and an adjacently-disposed cold fluid chamber 23-1, 23-2 effects a leakage flow, wherein the warm fluid 101 from the first warm fluid chamber 22-1 flows to the adjacent first cold fluid chamber 23-1 through the upper gap opening S1.

On the other hand, a counterflow hereto can occur in the lower section of the heat exchanger system 20 with the cold fluid 102 from the second cold fluid chamber 23-2 flowing into the second warm fluid chamber 22-2 through the second gap opening S2.

Thus, when in operation, the heat exchanger system 20 known from the prior art and depicted schematically in FIG. 3 cannot prevent an exchange of material from occurring between the first sector 22 and the second sector 23.

The solution according to the invention, as described above by means of an embodiment referencing the representation provided in FIG. 1, is suited for use in a rotating heat exchanger system 20 as depicted in FIG. 3 as an example in order to set the respective leakage rates of the upper and lower gap openings S1, S2 to a predefinable value by regulating the sealing body 2 of the device 1 to at least partly block the gap cross-section of gap openings S1, S2. It is in this way possible to effectively control—and if desired, prevent—the passage of fluid between the first sector 22 and the second sector 23 when the heat exchanger system 20 is in operation.

The embodiment depicted in FIG. 2, however, is a rotating heat exchanger system 20 pursuant FIG. 3, wherein the inventive device 1 is used to set the leakage rates for gap openings S1 and S2 on rotor 21 to a desired, and in particular predefinable value.

It is specifically provided hereby for the device 1 to comprise an annular sealing body 2. A retainer 4 holds the annular sealing body 2 at the first separation 24 and does so directly adjoining the rotor opening 25. In the embodiment depicted in FIG. 2, the annular sealing body 2 extends through the respective cold fluid chambers 23-1 and 23-2 of the second sector 23. Alternatively or additionally hereto, it is of course also conceivable for a corresponding and preferably annular sealing body 2 to extend through the respective warm fluid chambers 22-1 and 22-2 of the first sector 22.

It is pointed out that the sealing body 2 of the inventive device in the embodiment of the heat exchanger system 20 depicted in FIG. 2 comprises only one chamber 3. As noted above, the invention is not limited to the number of chambers 3 in sealing body 2. It is in particular also conceivable—as in the embodiment depicted in FIG. 10 for the sealing body 2 utilized in the rotating heat exchanger system 20 pursuant FIG. 2 to comprise a plurality of chambers.

By the sealing body 2 in the embodiment of the heat exchanger system 20 depicted in FIG. 2 being pressurized in regulated manner by a pressurized fluid such as e.g. compressed air, the sealing body 2 expands in the direction of the rotor 21 and thus at least partly clocks the flow cross-section responsible for the leakage losses as furnished by the gap openings S1, S2.

As indicated schematically, a controller 11 is also provided in the rotating heat exchanger system 20 depicted in FIG. 2 which regulates the pressurizing of and the pressure relief for sealing body 2. It is particularly preferred for the controller 11 to thereby be designed to adjust the cross-sectional expanding of the sealing body 2 effected by the supply of fluid as a function of the rotational speed of the rotor 21. This measure can effectively prevent the chamber 3 of the sealing body 2 from being pressurized such that the sealing body 2, and in particular the sealing lips (cf FIG. 1A, 1B) of the sealing body 2 come into contact with the respective lateral surface of the rotor 21 when the rotating heat exchangers system 20 is in operation and the rotor 21 rotates about its rotational axis. This kind of contact with the rotor surface is to be avoided in order to prevent wear on the sealing body 2.

When, however, as exchange of material needs to be effectively prevented between the first sector 22 and the second sector 23, it is of course conceivable for the chamber 3 of the sealing body 2 to be pressurized with pressurized fluid such that the sealing body 2 abuts the lateral surface of the rotor 21 and thus completely seals gap openings S1 and S2.

It is thus to be established in summary that the inventive solution is suitable for effectively preventing or at least minimizing a material mixing of the first fluid 101 flowing in the warm zone with the second fluid 102 flowing in the cold zone in a rotating heat exchanger system 20.

It is therefore conceivable to utilize the rotating heat exchanger system 20 as depicted schematically for example in FIG. 2 to air-condition (cool) an enclosed room 104, wherein this enclosed room 104 is furnished with a preventative inert gas fire extinguishing system.

The term "inert gas fire extinguishing system" or "inerting system" refers to a system to reduce the risk of and extinguish fire in an enclosed room. The extinguishing effect resulting from such a system is based on the principle of oxygen displacement. As is known, "normal" ambient air consists of 21% oxygen by volume, 78% nitrogen by volume and 1% other gases.

To control a fire or to reduce the risk of a fire developing, the oxygen content in the room's atmosphere is decreased by introducing an oxygen-displacing gas, for example nitrogen. An extinguishing effect is known to occur when the oxygen content drops to under 15% by volume. Depending on the combustible materials contained in the enclosed room, a further lowering of the oxygen content e.g. 12% by volume or lower may be necessary.

It has, however, been problematic in the past to use such an "inert gas extinguishing system," as the flooding of a room in a high fire danger area or a room on fire with an oxygen displacing gas is called, in an enclosed room which is air-conditioned or cooled by means of a rotating heat exchanger system 20 constitute a leakage responsible for a corresponding leakage loss. This leakage loss unavoidably leads to an exchange of material between the spatial atmosphere of the enclosed room and the external atmosphere, which counteracts the inerting level set for the enclosed room. Depending on the pressure difference between the enclosed room and the external atmosphere and the size of the gap openings S1, S2, the previously-lowered oxygen concentration in the enclosed room more or less quickly adjusts to the oxygen concentration of the normal ambient air such that effective fire extinguishing or effective fire prevention is no longer ensured. It was necessary in previous systems to continuously or regularly feed inert gas into the enclosed room so as to be able to compensate for the "inert gas loss" occurring through the gap openings S1, S2. The necessary adding of inert gas had the result that inert gas extinguishing technology has not previously been economical to use in rooms cooled by means of a rotating heat exchanger system.

Yet the inventive solution now provides a measure which allows the use of inert gas extinguishing technology in rooms air-conditioned with rotating heat exchanger systems without negatively impacting the general operating costs of the inert gas fire extinguishing system.

Particularly conceivable with the inventive solution is a method of operating an inert gas fire extinguishing system wherein in the event of a fire or to reduce the risk of fire in the enclosed room, the oxygen content in the enclosed room 104 is lowered to a predefined or definable inerting level by introducing an oxygen-displacing gas. By feeding fluid to the at least one chamber 3a, 3b of the sealing body 2, the cross-section of the sealing body 2 is expanded such that the gap openings S1, S2 at rotor 21 are at least partly sealed.

It is thereby advantageous when the sealing body 2 does not completely seal the gap openings S1, S2 upon the introduction of the oxygen-displacing gas into the spatial atmosphere of the enclosed room 104 in order to provide the necessary release of pressure through said gap openings S1, S2 when the enclosed room is flooded. The inventive solution thus does away with the need for separate pressure relief valves, etc.

Having said that, in the event of a fire or to reduce the risk of a fire in the enclosed room 104, it is also preferred to stop rotor 21 from rotating in order for sealing body 2 to completely seal the gaps S1, S2 without subjecting the sealing body 2 to increased wear. The rotation of rotor 21 should preferably be stopped first and then the oxygen-displacing gas introduced into the room's atmosphere thereafter. When there is no further need for pressure compensation, the gaps S1, S2 should be completely sealed and done so by pressurizing the at least one chamber 3 of the sealing body 2 with a pressurized fluid such that the cross-section of sealing body 2 expands in the flow cross-section of the gap openings S1, S2 and thus completely seals said gap openings S1, S2. Of course, a different sequencing to the above-specified method steps is also conceivable.

In one preferred further development of the latter embodiment in which an enclosed room 104 is furnished with a rotating heat exchanger system 20 in accordance with the embodiment depicted in FIG. 2 on the one hand, and with an inert gas fire extinguishing system on the other, the oxygen content in the enclosed room is measured continuously or at predefined times or upon predefined events. Depending on the oxygen content measured, additional oxygen-displacing gas is fed into the enclosed room as necessary in order to maintain the previously-set inerting level (within a certain control range as needed).

Alternatively or additionally hereto, it is of course also conceivable to use a fire detecting device to detect whether a fire characteristic is present in the spatial atmosphere of the enclosed room on a continuous basis or at predefined times or upon predefined events, wherein the introduction of the oxygen-displacing gas is initiated automatically as a function of the signal from the fire-detecting device.

When such an initiation is made in the enclosed room, it is not only preferable to stop the rotor 21 and effect a complete sealing of the gap openings S1, S2 but also to stop the two ventilator systems 105, 106 and in particular the first ventilator system 105 so as to not further fan a fire which may broken out in the enclosed room 104, even though when the oxygen-displacing gas is introduced into the enclosed room 104, the first ventilator system 104 serves to set the necessary consistent inerting level as quickly as possible as the first ventilator system 104 occasions a continuous mixing of the room's atmosphere.

It thus remains to note that the inventive solution allows the economical use of a rotating heat exchange system 20 to cool the spatial atmosphere of a room 104 equipped with an inert gas fire extinguishing system for the purpose of fire prevention. The inventive solution allows a simple yet effective preventing or at least reducing of the passage of fluid between the respective zones 22, 23, of the heat exchanger system 20 as needed so that a substantially lesser volume of the inerted room's atmosphere will flow to the cold air side of the heat exchanger system 20 and thus only a lesser amount of inert gas also needs to be supplied.

The invention is not limited to the embodiments as described above with reference to the figures but is instead disclosed by means of the accompanying claims.

LIST OF REFERENCE NUMERALS

1 device for setting a leakage rate
2 sealing body
3a, 3b chamber
4 retainer
5a, 5b retainer projections
6 center wall
7 opening
8a, 8b flute
9 pipe systems
10 fluid/compressed air source
11 controller
12 flow sensor
13a, 13b sealing lip
14 seal base
15 nozzle
16 screwed connection
20 rotating heat exchanger system
21 rotor
22 first sector
23 second sector
24 first separation
25 rotor opening
26 second separation
27 third separation
101 warm fluid
102 cold fluid
103 data processing equipment
104 server room
105 first ventilator system
106 second ventilator system
A1 first component
A2 second component
F1 first lateral surface
F2 second lateral surface
S leakage/gap
S1 upper gap
S2 lower gap
V1 valve

The invention claimed is:

1. A method for minimizing the risk of fire and extinguishing fires in an enclosed room, comprising:
    transferring thermal energy through a rotating heat exchanger system between a warm fluid and a cold fluid said rotating heat exchanger system having a rotatable rotor, flowing the warm fluid through a first sector and flowing the cold fluid through a second sector,
    maintaining a spatial separation between the first sector and the second sector,
    rotating the rotatable rotor having ducts parallel to its rotational axis and extending through the spatial separation, the rotor passing through the first and second sectors upon rotation,
    setting a leakage rate of a gap opening between a front face of the separation and a lateral surface of the rotor to a pre-defined value via a leakage rate setting device having a sealing body with at least one chamber and a pipe system connected to said at least one chamber and supplying the chamber with fluid in a regulated manner, the sealing body at least partially formed of a flexible material having a cross-section expandable in a direction of leakage upon fluid being supplied to the at least one chamber,
    drawing the warm fluid from the closed room using a first ventilator system,
    flowing such drawn warm fluid through a first sector of the rotating rotor and thereafter feeding the warm fluid back into the closed room,
    flowing the cold fluid through a second sector of the rotating rotor via a second ventilator system,
    introducing an oxygen displacing gas to lower oxygen content in the enclosed room to a predefined combustibly inert level, and
    expanding a cross-section of the sealing body by supplying fluid to the at least one chamber of the sealing body such that the gap between the front face of the separation and the lateral surface of the rotor is at least partly sealed in a controlled manner.

2. The method according to claim 1, further comprising the step of stopping the rotation of the rotor in the event of a fire or risk of fire in the enclosed room.

3. The method according to claim 2, further comprising the step of expanding the cross-section of the sealing body such that the gap between the front face of the separation and the lateral surface of the rotor is completely sealed.

4. The method according to claim 3, further comprising the steps of measuring the oxygen content in the enclosed room at predefined times, and maintaining the oxygen content which has been lowered to the inert level by introducing additional oxygen displacing gas.

5. The method according to claim 2, further comprising the step of expanding the cross-section of the sealing body such that the gap between the front face of the separation and the lateral surface of the rotor is completely sealed.

6. The method according to claim 2, further comprising the steps of measuring the oxygen content in the enclosed room at predefined times, and maintaining the oxygen content which has been lowered to the inert level by introducing additional oxygen displacing gas.

7. The method according to claim 2, further comprising the steps of detecting whether a fire characteristic is present in the enclosed room at predefined times using a fire detecting device, and stopping one or both of the first ventilator system and the second ventilator system in the event of a risk of a fire in the enclosed room.

8. The method according to claim 2, further comprising the steps of measuring the oxygen content in the enclosed room at predefined times, and maintaining the oxygen content which has been lowered to the inert level by introducing additional oxygen displacing gas.

9. The method according to claim 1, further comprising the steps of measuring the oxygen content in the enclosed room at predefined times, and maintaining the oxygen content which has been lowered to the inert level by introducing additional oxygen displacing gas.

10. The method according to claim 1, further comprising the steps of detecting whether a fire characteristic is present in the enclosed room at predefined times using a fire detecting device, and stopping one or both of the first ventilator system and the second ventilator system in the event of a fire or the risk of a fire in the enclosed room.

11. A system to minimize the risk of fire and to extinguish fires in an enclosed room, wherein the system comprises the following:
- a rotating heat exchanger system to transfer thermal energy between a warm fluid and a cold fluid, wherein the rotating heat exchanger system comprises the following:
  - a first sector through which flows the warm fluid and a second sector through which flows the cold fluid;
  - a separation which spatially separates the first sector and the second sector from one another;
  - a rotating heat exchanger to transfer thermal energy from the warm fluid flow to a cold fluid flow, wherein the rotating heat exchanger comprises a rotatable-mounted rotor exhibiting ducts parallel to its rotational axis and extending through a rotor opening running through the separation such that it passes through the first and second sectors upon rotation; and
  - at least one device for setting a leakage rate of a gap opening between a front face of the separation and a lateral surface of the rotor to a predefined value, wherein the device comprises a sealing body having at least one chamber and a pipe system connected to said at least one chamber through which the chamber can be supplied with fluid in a regulated manner, wherein the sealing body is at least partly formed from a flexible material and its cross-section expandable in a direction of a leakage upon fluid being supplied to the at least one chamber;
- a first ventilator system to draw the warm fluid from the enclosed room such that the drawn fluid flows through the first sector of the rotating heat exchanger system and is thereafter fed back to the enclosed room again:
- a second ventilator system to effect the flowing of a cold fluid through the second sector of the rotating heat exchanger system;
- a system to supply an oxygen-displacing gas, and
- a controller arranged and constructed to control at least some of the controllable components of the system.

12. The system according to claim 11, wherein a retainer is further provided to hold the sealing body.

13. The system according to claim 12, wherein the controller is designed to adjust the cross-sectional expanding of the sealing body effected by the supply of fluid as a function of a predefined maximum allowable leakage rate for the leakage.

14. The system according to claim 12, wherein the controller is designed to adjust the cross-sectional expanding of the sealing body effected by the supply of fluid as a function of the rotational speed of the rotor.

15. The system according to claim 11, wherein the controller is designed to adjust the cross-sectional expanding of the sealing body effected by the supply of fluid as a function of a predefined maximum allowable leakage rate for the leakage.

16. The system according to claim 15, wherein the controller is designed to adjust the cross-sectional expanding of the sealing body by setting the amount of fluid to be supplied to the at least one chamber.

17. The system according to claim 16, wherein to supply a pressurized fluid, a source connected or connectable to the at least one chamber via the pipe system is further provided for the regulated supplying of the pressurized fluid to the at least one chamber.

18. The system according to claim 11, wherein the controller is designed to adjust the cross-sectional expanding of the sealing body effected by the supply of fluid as a function of the rotational speed of the rotor.

* * * * *